United States Patent Office 3,127,431
Patented Mar. 31, 1964

3,127,431
METALLORGANIC HALONITRATES
Walter Fink, Zurich, Switzerland, assignor to Monsanto Chemical Company, St. Louis, Mo., a corporation of Delaware
No Drawing. Filed Apr. 24, 1961, Ser. No. 104,797
Claims priority, application Switzerland Apr. 28, 1960
16 Claims. (Cl. 260—429.7)

It was found that novel metallorganic halonitrates can be prepared by the reaction of olefinically unsaturated metal, metalloid, phosphorus, silicon and boron compounds with halonitrates.

The reaction may be schematized as follows:

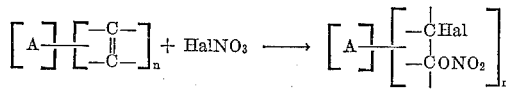

In this formula A signifies a metal, metalloid, boron, phosphorus or silicon compound which is joined in any manner to at least one vinyl or vinylene group capable of undergoing addition reactions and $n$ is an integer. For the sake of simplicity these starting products are subsequently abbreviated to "unsaturated metallorganic compounds." The valences of the vinyl or vinylene group not showing substituents in the formula can optionally be substituted. The endproduct may still possess some unsaturation but it now contains on at least two adjacent carbon atoms, or on two carbon atoms separated by a vinylene group altogether one halogen atom and one nitrate group which have been introduced by the reaction.

The process of the invention works at low temperatures and all unsaturated metallorganic compounds which are stable in some measure at the reaction temperature, can be reacted with halonitrate. In general, the corresponding metallorganic halonitrates are formed as formularized above. Apart from some exceptions yet to be mentioned, these are mostly capable for isolation. The halonitrate reacts in the form

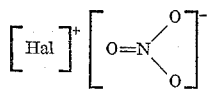

without oxidation or destruction of the metallorganic molecule and the anion $NO_3^-$ generally goes to the more positve carbon atom of the starting compound.

Until now, only a few metallorganic compounds which have the nitrate group directly attached to metal have been reported. Since decomposition occurs, it does not seem possible to prepare the corresponding compounds having one or even more nitrate groups by esterification with $HNO_3$ of hydroxyl groups of organic radicals attached to metallorganic compuonds. The more the starting compounds resemble true metallorganic compounds, the more sensitive are they towards halogens and protonic acids. In contrast to the analogous silicon compounds, an organic tin compound of the type $R_3SnCH=CH_2$ ($R=CH_3$, $nC_4H_9$, $C_6H_5$) reacts, for example, with iodine (in ether at $-38°$ C.), HCl, HBr, mercaptans and even weak acids, by splitting off the vinyl group (D. Seyferth, J. Am. Chem. Soc. 79, 2133, 1957). In contrast to this one obtains surprisingly with chloronitrate the respective metallorganic derivatives according to the following equations:

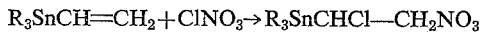
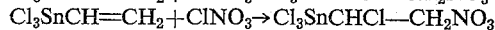
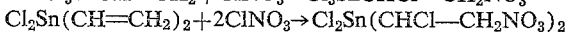

In these and most other cases, the addition of chloronitrate occurs practically quantitatively. That the metallorganic halonitrates of the invention are not simply adducts like, for example, $Cl_2Sn(CH=CH_2)_2.2ClNO_3$ could be proved by several reactions and by infrared spectra. Relying on the well known difference in stability of the two halogens in $α,β$-dihalogenometal compounds, it could be concluded from hydrolysis tests that at least with the chloronitrate treated vinylmetal compounds, the chlorine atom joins the $α$-position and the nitrate group the $β$-position. The position of the introduced substituents can be determined mostly in advance and the addition occurs generally in a Markownikoff way. But in certain cases, depending on the presence of electron supplying or electron withdrawing substituents, an inverse sequence (viewed from the metal group M) of the introduced halonitrate components is also possible:

$CNO_3$—$CCl$ ... M or $CCl$—$CNO_3$ ... M and in certain circumstances, both variations may appear simultaneously. A further exception may arise with conjugated olefinic double bonds, since the addition of the halonitrate components occur in the $α,δ$-position as is well known from similar reactions:

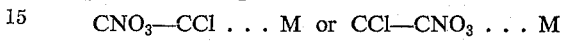

The vinylene group between the $β,γ$-carbon atoms also can react with further halonitrate.

An accumulation of nitrate groups in the same organic chain or in different chains of the metallorganic compounds causes decreased stability which, depending on the organic ligands and the metal, may be different and be such that the compound explodes. Thus, it is evident that, whatever the number of olefinical double bonds present in the starting product, the number of nitrate groups which can be introduced in an unsaturated metallorganic compound must be limited for this reason. A comparison of the explosion points and ease of distillation of the metallorganic chloronitrates compiled below reveals these relations.

The compounds which have two halogen atoms on the olefinically bounded carbon atom are also very unstable. The corresponding organic acid halides may be obtained by the following reaction:

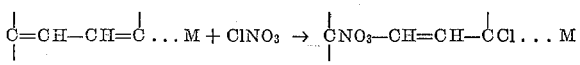

This novel reaction is the object of a copending patent application of the same inventor and the same assignee.

Strictly speaking, the term "halonitrate" used throughout this patent application signifies chloronitrate. Fluoronitrate is a very explosive and poisonous substance, iodonitrate in view of the tendency of iodine to form a trinitrate rather than the desired mononitrate is difficult to obtain, and bromonitrate is extremely easily decomposed and up to now has only been prepared in small quantities in solution. In view of these facts, chloronitrate is the most qualified reactant for carrying out the invention; but, of course, other halonitrates will react in a similar manner.

The necessary chloronitrate can be obtained by reacting nitrogen pentoxide ($N_2O_5$) with chlorine monoxide ($Cl_2O$) at low temperature quantitatively according to the following equation:

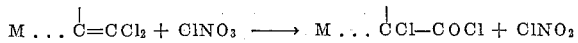

(M. Schmeisser, W. Fink and K. Brändle, Angew. Chem. 69, 780, 1957). Depending on the circumstances, it can also be prepared "in situ" in the reaction mixture.

The unsaturated metallorganic compounds serving to put into practice the invention are very numerous. They can contain radicals of unsaturated straight-chain, branched-chain or cyclic hydrocarbons as, for example, ethylene, propylene, butylene, isobutylene, isoamylene, 1,1,2-trimethylethene, hexene-1, hexene-3, 2-ethylbutene, isohexene, 1,1-diethyl-2-methylethene, octene-2, octene-4, 2,4,4-trimethylpentene-2, diisobutylene, decene-1, triisobutylene, 2,4,4,6,6-pentamethylheptene, tetraisopropylene, dodecene-1, tridecene-1, tetradecene-1, pentadecene-1, hexadecene-1, octadecene-1, octadecene-9, tetra-n-butylethene etc.; cyclobutene, cyclopentene, cycloheptene, methylcyclohexene, 1,3 - dimethylcyclohexene, 1,1,3-trimethylcyclohexene, camphene, menthene, pinene, fenchene etc.; styrene, allylbenzene, butenylbenzene, 1,1-diphenylethene, stilbene etc.; butadiene-1,3, isoprene, pentadiene-1,2, 2-methyl-3-methylbutadiene, diallyl, dipropylene, cyclopentadiene, cyclohexadiene-1,3, cyclohexadiene - 1,4, 1-methylcyclohexadiene-1,4, cycloheptatrien, tropilidene, 1,2 - dimethylcyclohexadiene, 1,3-dimethylcyclohexadiene, cyclooctatriene, cyclooctatetraene, dicyclopentadiene, dipentene, terpinene, cymene, 1,4-diethylcyclohexadiene, 2,5-dimethyl-3,4-diisopropylhexadiene-2,4, menthadiene, squalene etc. Such radicals can also be attached to several identical or different metals, metal groups respectively. An araliphatic radical such as, for example, styrene can be joined to the metal through its aliphatic and/or aromatic part:

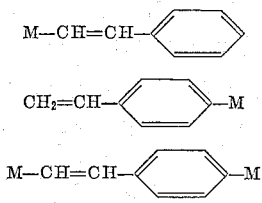

The chains of the radicals can be interrupted by heteroatoms, especially oxygen, sulfur and nitrogen as, for example, the radicals of ethyl-vinylether, butyl-vinylether, divinylether, propyl-vinylsulfide, divinylsulfide, methylallylether, diallylether, diallylsulfide, dipentenylether, N-allyldimethylamine, N-allyl-benzylamine etc.; they can also be attached to the metal by heteroatoms. Metallorganic compounds with radicals of substituted unsaturated hydrocarbons such as unsaturated halohydrocarbons, ketones, nitriles, carboxylic acids, esters, amides etc. are well known and are also suitable starting materials for the realization of the present invention.

Particularly useful among the halogen substituted derivatives are those having one or two halogen atoms on the olefinical double bond, thus showing a grouping

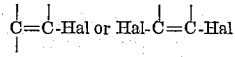

Such halogenated unsaturated metallorganic compounds are still capable of undergoing addition reactions with $ClNO_3$. With the radicals of, for example, chloroethylene, 1,2-dichloroethylene and 2-chloropropylene the addition proceeds according to the following equations:

M ... CH=CHCl + ClNO₃ → M ... CHCl—CH(Cl)NO₃
M ... CCl=CHCl + ClNO₃ → M ... CCl₂—CH(Cl)NO₃
                                 M ... C(Cl)NO₃—CHCl₂ resp.
M ... CH=CCl—CH₃ + ClNO₃ → M ... CHCl—C(Cl)NO₃—CH₃

It may be noted that compounds of this type cannot be prepared by the use of previous method of preparation which involves esterification of a corresponding hydroxyl compound with nitric acid—even if the starting material is stable towards concentrated nitric acid or nitratizing agent resp.—because the necessary starting material bearing a halogen atom and a hydroxyl group on the same carbon atom is not capable of existence.

Compounds of this kind upon treatment with $SnCl_4$ are converted to the corresponding α-haloaldehyde or α-haloketone derivative respectively:

M ... CHCl—CH(Cl)NO₃ $\xrightarrow{SnCl_4}$ M ... CHCl—CHO
M ... CHCl—C(Cl)NO₃—CH₃ $\xrightarrow{SnCl_4}$ M ... CHCl—CO—CH₃

Among the substituted metallorganic chloronitrates special mention must be made of those which have apart from a vinyl, carbonyl, thiocarbonyl, cyano, imino or nitro group, have also on the α-carbon atom a hydrogen atom and a halogen atom, and on the β-carbon atom a nitrate group and, possibly, a halogen atom.

Compounds of this type and also the analogues with a halogen atom in place of $NO_3$, upon treatment with KF, preferably at low temperatures and in a solvent such as, for example, acetamide are transformed into the corresponding unsaturated α-halogen derivatives:

M ... CHNO₃—CHCl—CN $\xrightarrow{KF}$ M ... CH=CCl—CN

M ... CHNO₃—CHCl—COOR″ $\xrightarrow{KF}$ M ... CH=CCl—COOR″

These novel reactions and the products thereof are objects of a copending patent application of the same inventor and the same assignee.

The metallorganic halonitrates of the invention as schematized above can be defined more closely by the following formula:

$$(R)_a(R')_bM(X)_c(Y)_d$$

In this formula R and R' are aliphatic, cycloaliphatic, cycloaliphatic-aliphatic, araliphatic or—possibly by inclusion of M—heterocyclic radicals. Moreover R' can also be an aromatic radical. R possesses on at least two neighboring carbon atoms or on two carbon atoms separated by a vinylene group one halogen atom, preferably chlorine atom, and a NO₃-group introduced by the reaction. In occurrence, these radicals can also contain other substituents such as F, Cl, Br, I, —OH, —OR″, —SH, SR″, —NO₂, —NO, ≡N, =O, =S, =NH, =NR″, —NH₂, —NHR″, —NR″₂, —SO₃H, —SO₃R″ etc. or possible combinations therefrom and/or their chains may be interrupted by heteroatoms like O, N, S etc. or heteroatom groups like —SO—, —SO₂—, —NH—, —NR″— etc. and/or be attached to the metal M through a carbon atom instead also through a heteroatom, preferably O, S or N. (R″ has the usual significance in such compounds.) Moreover R and R' can contain as a substituent a further group $$M(R)_a(X)_c(Y)_d \text{ or } M(R')_b(X)_c(Y)_d$$

and especially form a metallorganic compound of the formula

RR′M—R′—MR′R or RR′M—R—MR′R

M is a metal such as, for example, Li, K, Na or especially a metal being at least divalent such as, for example, Be, Mg, Ca, Ti, Zr, V, Cr, Zn, Cd, Al, Ge, Sn, Pb, As, Sb, Se, Bi, Te, B, Si, P etc. or a group containing one of the above elements such as for example, VO, CrO₂, GeO, GeOGe, SnGe, Sn—Sn, SnO, SnOSn, As—As, As=As, AsO, AsO₂, AsOAs, AsSAs, SbO, SbO₂, Sb=Sb, BiO, PO, PO₂, PS, PSe, P—P, P=P, POP, OPOPO, PSP, OPSPO, P(O)As, P(O)Sn, [P(O)]₂Sn, P=As, Si—Si, SiO, SiOSi, B—B, BO, BOB, Na₂B, B₃O₃ etc. or an onium salt group such as, for example, PZ, AsZ, SbZ, where Z is the acid radical of a nonbasic acid such as, for example, hydrohalide, chloric, perchloric, toluolsulfonic, hydrocyanic, hydrothiocyanic, acetic, lauric etc. or a respective part of a polybasic acid such as, for example, sulfuric, phosphoric, carbonic, oxalic etc.; Y is a cyano, thiocyano or amino radical, or particularly when M is one of the elements Sn, Ge, Pb, Hg, P, Si, or B, a hydroxyl group; X is a monobasic acid radical, preferably fluorine, chlorine, bromine or iodine, or a respective part of a polybasic acid; $a$ is an integer, $b$, $c$ and $d$ are zero or integers, whereby the quantity $a+b+c+d$ is equal to the valency of the element or element group respectively in the present metallorganic compound. Usually R and R' will each have not more than 18 carbon atoms, and in most of the preferred compounds each not more than 6 carbon atoms with R being aliphatic hydrocarbon or alkyl having the nitrate and chloro substituents and R' alkyl or alkoxy.

The reaction is suitably carried out by gradually adding the ClNO₃ to the unsaturated metallorganic compound at temperatures down to —100° C. preferably between —50° and 0° C., in an inert solvent. If one wishes to isolate the products, low boiling solvents such as, for example, CCl₂F₂, CHCl₂F, CCl₃F are particularly suitable. When reacting unstable compounds, the theoretical amount of ClNO₃ is added, while with stable compounds, such as, for example, alkenyltinchlorides, alkenylchlorosilanes, alkenylphosphinoxides etc., an excess of ClNO₃ may perhaps be favorable. Many of the metallorganic halonitrates can be distilled; but, they can also be used directly in the reaction mixture for further reactions such as, for example, Grignard reactions, disproportionations, polymerizations etc.

The metallorganic halonitrates are biocides, particularly for the extermination of noxious animals and plant diseases, and are also intermediates for the manufacture of polymers. The silicon compounds may be employed as block flame arrestors. Also compounds such as 1 and 6 reported in Table 1 below are converted by hydrolysis to siloxane polymers.

EXAMPLE 1

To 25.4 g. of vinyltrichlorosilane (Cl₃SiCH=CH₂, B.P. 92° C./760 mm.) dissolved in 200 ml. of CCl₃F (Frigen 11, B.P. 23.7° C./760 mm.) is added by drops at temperatures between —70° C. and —30° C. with intensive stirring 18.0 g. of NO₃Cl (excess), dissolved in about 18-20 ml. of CCl₃F, any moisture being excluded. The reaction occurs without special violence. When the addition of NO₃Cl is completed, the excess of NO₃Cl as well as the solvent is distilled off as good as possible under reduced pressure. The remaining, a waterclear liquid, is subjected to fractional distillation. Yield: 95.0% of the theory; B.P. 42° C./5.0×10⁻² mm.; $n_D^{20}$=1.4800; I.R. spectra, cm.⁻¹: 2950 (m.), 1660 (vs.), 1430 (w.), 1280 (vs.), 860 (m.), 810 (s.).

Analysis.—C₂H₃O₃Cl₄NSi (M=258.9): Percent C calculated, 9.3; found, 10.4. Percent H calculated, 1.2; found, 2.9. Percent N calculated, 5.4; found, 5.3. Percent Si calculated, 10.8; found, 11.3. Percent Cl calculated, 54.7; found, 52.3.

EXAMPLE 2

To 8.4 g. of trivinylarsine (As(CH=CH₂)₃, B.P. 45-46° C./41 mm.), dissolved in 20.0 ml. of CCl₃F, is added under same conditions as indicated in Example 1, 17.8 g. of NO₃Cl, dissolved in about 35-40 ml. of CCl₃F. After the addition of NO₃Cl is completed, the small excess of NO₃Cl and the solvent are distilled off at temperatures between —50° C. and —10° C. under reduced pressure. Thus, may be obtained a perfect white solid residue being As(CHCl—CH₂NO₃)₃. Yield: 98.6% of the theory; M.P. +5° C.; explosion point 46° C./720 mm.

Analysis.—C₆H₉O₉Cl₃N₃As (M=448.4); Percent N calc., 9.3; found, 9.3. Percent as calc., 16.7; found, 16.6.

EXAMPLE 3

To 14.2 g. of vinyl-triethylsilane (CH₂=CHSi(C₂H₅)₃; 0.1 mole), dissolved in 100 ml. of CCl₃F, is added under same conditions as indicated in Example 1 25.1 g. of NO₃Cl (0.1 mole + excess 5%), dissolved in about 40-50 ml. of CCl₃F. When the addition of chloronitrate is completed, the small excess of chloronitrate and the solvent are distilled off at temperatures between —50° C. and —10° C. under reduced pressure. The remaining is crude α-chloro-β-nitrato-ethyl-triethylsilane. Yield: 91% of the theory; B.P. 67-68° C./1.5×10⁻¹ (with decomposition); $n_D^{20}$=1.4723.

The adduct also decomposes slowly at room temperature.

Analysis.—C₈H₁₈ClO₃NSi (M=239.7); percent N calc., 5.79; found, 5.91. Molecular weight found, 243.5.

In similar manner are prepared all other metallorganic halonitrates, if necessary under exclusion of oxygen. In the table below are compiled the new compounds.

Table I

| | Reaction product | Boiling point, ° C./mm. Hg | Yield, percent |
|---|---|---|---|
| 1 | (NO₃CH₂CHCl)—SiCl₃ | 42/5.0×10⁻² | 95.0 |
| 2 | (NO₃CH₂CHCl)₃—As | (¹) | 98.6 |
| 3 | (NO₃CH₂CHCl)Si(C₂H₅)₃ | (¹) | 91.0 |
| 4 | (NO₃CH₂CHCl)₂—SnCl₂ | (¹) | 87.0 |
| 5 | (NO₃CH₂CHCl)—P(O)(OC₂H₅)₂ | 115/1.0×10⁻¹ | 97.0 |
| 6 | (NO₃CH₂CHCl)₂—SiCl₂ | (¹) | 93.2 |

¹ Cannot be distilled without decomposition.

Although the invention has been described in terms of specified apparatus and materials which are set forth in considerable detail, it should be understood that this is by way of illustration only and the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for preparing metallorganic chloronitrates of the formula (R)ₐ(R')ᵦM(X)ᶜ wherein R is selected from the class consisting of CH₂NO₃CHCl and CH₂NO₃CH=CHCHCl R' is selected from the class consisting of lower alkyl and lower alkoxy radicals, M is selected from the class consisting of Si, As, Sn, and P=O, X is a halogen atom, a is an integer, b and c are selected from 0 and integers, and a+b+c corresponds to the valence of M in the compound comprising reacting at a temperature in the range of 0° C. to —100° C. chloronitrate with olefinic metallorganic compounds of the formula (R'')ₐ(R')ᵦM(X)ᶜ wherein R'' is selected from the class consisting of CH₂=CH and CH₂=CHCH=CH, and R', M, X, a, b, and c are as defined hereinabove.

2. A process for preparing metallorganic chloronitrates of the formula (NO₃CH₂CHCl)ₐPO(OR'')ᵦ wherein R'' is an alkyl radical having not more than 6 carbon atoms, a is an integer of from 1 to 2, b is an integer and a+b equals 3 comprising reacting at a temperature in the range of 0° C. to —100° C. chloronitrate with olefinic metallorganic compounds of the formula (CH₂=CH)ₐPO(OR'')ᵦ wherein R'', a and b are as defined hereinabove.

3. A process for preparing metallorganic chloronitrates of the formula (NO₃CH₂CHCl)ₐ(R')ᵦSi(X)ᶜ wherein R' is an alkyl radical having not more than 6 carbon atoms, X is a halogen atom, a is an integer of from 1 to 2, b and c are selected from 0 and integers, a+b+c equals 4 comprising reacting at a temperature in the range of 0° C. to —100° C. chloronitrate with olefinic metallorganic compounds of the formula (CH₂=CH)ₐ(R')ᵦSi(X)ᶜ wherein R', a, b and c are as defined hereinabove.

4. A process for preparing metallorganic chloronitrates of the formula (NO₃CH₂CHCl)ₐ(R')ᵦAs(X)ᶜ wherein R' is an alkyl radical having not more than 6 carbon atoms, X is a halogen atom, a is an integer of from 1 to 3, b and c are selected from 0 and integers, and a+b+c equals 3 comprising reacting at a temperature in the range of 0° C. to —100° C. chloronitrate with olefinic metallorganic compounds of the formula (CH₂=CH)ₐ(R')ᵦAs(X)ᶜ wherein R', a, b and c are as defined hereinabove.

5. A process for preparing metallorganic chloronitrates of the formula (NO₃CH₂CHCl)ₐ(R')ᵦSn(X)ᶜ wherein R' is an alkyl radical having not more than 6 carbon atoms, X is a halogen atom, a is an integer of from 1 to 2, b and c are selected from 0 and integers, and a+b+c equals 4 comprising reacting at a temperature in the range of 0° C. to −100° C. chloronitrate with olefinic metallorganic compounds of the formula $$(CH_2=CH)_a(R')_bSn(X)_c$$

wherein R′, a, b and c are as defined hereinabove.

6. Metallorganic chloronitrates of the formula $$(R)_a(R')_bM(X)_c$$

wherein R is selected from the class consisting of $CH_2NO_3CHCl$ and $CH_2NO_3CH=CHCHCl$, R′ is selected from the class consisting of lower alkyl and lower alkoxy radicals, M is selected from the class consisting of Si, As, Sn, and P=O, X is a halogen atom, a is an integer, b and c are selected from 0 and integers, and $a+b+c$ corresponds to the valence of M in the compound.

7. Metallorganic chloronitrates of the formula $$(NO_3CH_2CHCl)_aPO(OR'')_b$$

wherein R″ is an alkyl radical having not more than 6 carbon atoms, a is an integer selected from 1 and 2, b is an integer and $a+b$ equals 3.

8. Metallorganic chloronitrates of the formula $$(NO_3CH_2CHCl)_a(R')_bSi(X)_c$$

wherein R′ is an alkyl radical having not more than 6 carbon atoms, X is a halogen atom, a is an integer from 1 to 2, b and c are selected from 0 and integers and $a+b+c$ equals 4.

9. Metallorganic chloronitrates of the formula $$(NO_3CH_2CHCl)_a(R')_bAs(X)_c$$

wherein R′ is an alkyl radical having not more than 6 carbon atoms, X is a halogen atom, a is an integer from 1 to 3, b and c are selected from 0 and integers, and $a+b+c$ equals 3.

10. Metallorganic chloronitrates of the formula $$(NO_3CH_2CHCl)_a(R')_bSn(X)_c$$

wherein R′ is an alkyl radical having not more than 6 carbon atoms, X is a halogen atom, a is an integer from 1 to 2, b and c are selected from 0 and integers, and $a+b+c$ equals 4.

11. $(NO_3CH_2CHCl)—SiCl_3$.
12. $(NO_3CH_2CHCl)_3—As$.
13. $(NO_3CH_2CHCl)Si(C_2H_5)_3$.
14. $(NO_3CH_2CHCl)_2—SnCl_2$.
15. $(NO_3CH_2CHCl)—P(O)(OC_2H_5)_2$.
16. $(NO_3CH_2CHCl)_2—SiCl_2$.

References Cited in the file of this patent
UNITED STATES PATENTS
2,756,246  Burkhard _____ July 24, 1956